United States Patent
Song et al.

(10) Patent No.: US 12,513,638 B2
(45) Date of Patent: Dec. 30, 2025

(54) SYSTEMS AND METHODS FOR ENHANCED MULTIPLE TRANSMISSION AND RECEPTION POINT COMMUNICATIONS

(71) Applicant: Verizon Patent and Licensing Inc., Basking Ridge, NJ (US)

(72) Inventors: Lei Song, San Diego, CA (US); Jin Yang, Orinda, CA (US); Cindy Dong, Bridgewater, NJ (US); Zheng Zhao, Plainsboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 430 days.

(21) Appl. No.: 18/155,268

(22) Filed: Jan. 17, 2023

(65) Prior Publication Data

US 2024/0244553 A1 Jul. 18, 2024

(51) Int. Cl.
*H04W 56/00* (2009.01)
*H04L 5/00* (2006.01)
*H04W 24/10* (2009.01)

(52) U.S. Cl.
CPC ......... *H04W 56/004* (2013.01); *H04L 5/0051* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2022/0231739 A1* | 7/2022 | Venugopal | H04W 72/044 |
| 2024/0048309 A1* | 2/2024 | Farag | H04L 5/0094 |
| 2024/0097848 A1* | 3/2024 | Gao | H04L 5/0035 |
| 2024/0224206 A1* | 7/2024 | Liu | H04W 56/0015 |

* cited by examiner

*Primary Examiner* — Scott M Sciacca

(57) ABSTRACT

In some implementations, a device associated with at least a first transmission reception point (TRP) and a second TRP may acquire information that indicates timing difference information between the first TRP and the second TRP relative to a user equipment (UE). The device may synchronize, based on the timing difference information, a time of the first TRP with a time of the second TRP for joint transmission of a first signal by the first TRP and a second signal by the second TRP to the UE.

20 Claims, 12 Drawing Sheets

SYSTEMS AND METHODS FOR ENHANCED MULTIPLE TRANSMISSION AND RECEPTION POINT COMMUNICATIONS

BACKGROUND

A multiple transmission and reception point (mTRP) communication technique, such as a coherent joint transmission (CJT) communication technique and/or a single frequency network (SFN) communication technique, may be used to communicate with a user equipment (UE) via cooperative or coordinated communications. For example, in a CJT communication technique, different transmission and reception points (TRPs) may jointly communicate with the UE in a manner that focuses energy at a position of the UE based on channel state information (CSI). As another example, in an SFN communication technique, different TRPs may simultaneously transmit signals to the UE using the same frequency, and the UE may aggregate, or accumulate, the simultaneous signal transmissions from the multiple TRPs.

DETAILED DESCRIPTION OF EXAMPLE EMBODIMENTS

The following detailed description of example implementations refers to the accompanying drawings. The same reference numbers in different drawings may identify the same or similar elements.

A multiple transmission and reception point (mTRP) communication technique, such as a coherent joint transmission (CJT) technique and/or a single frequency network (SFN) technique, may be used to improve and/or enhance communications with a user equipment (UE). For example, a CJT communication technique may be used to improve coverage and/or to improve average throughput via a high performance backhaul and synchronization among transmission and reception points (TRPs) that may be disposed at different locations. As another example, an SFN communication technique may be used to improve coverage by aggregating, or accumulating, simultaneous signal transmissions transmitted by multiple TRPs to the UE.

Figure 1A:
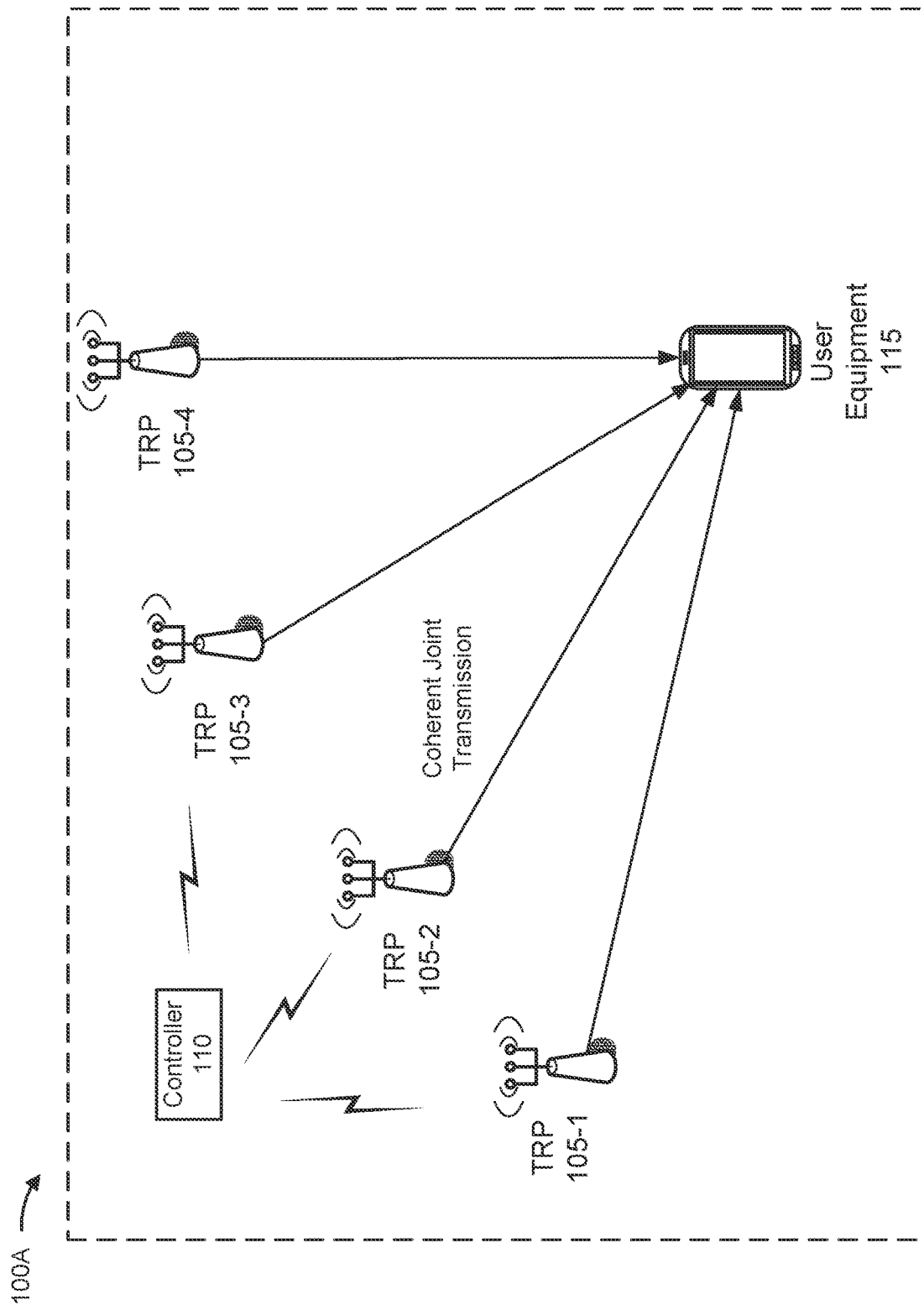
FIG. 1A is a diagram illustrating an example associated with a CJT communication technique in accordance with the present disclosure.
Figure 1B:
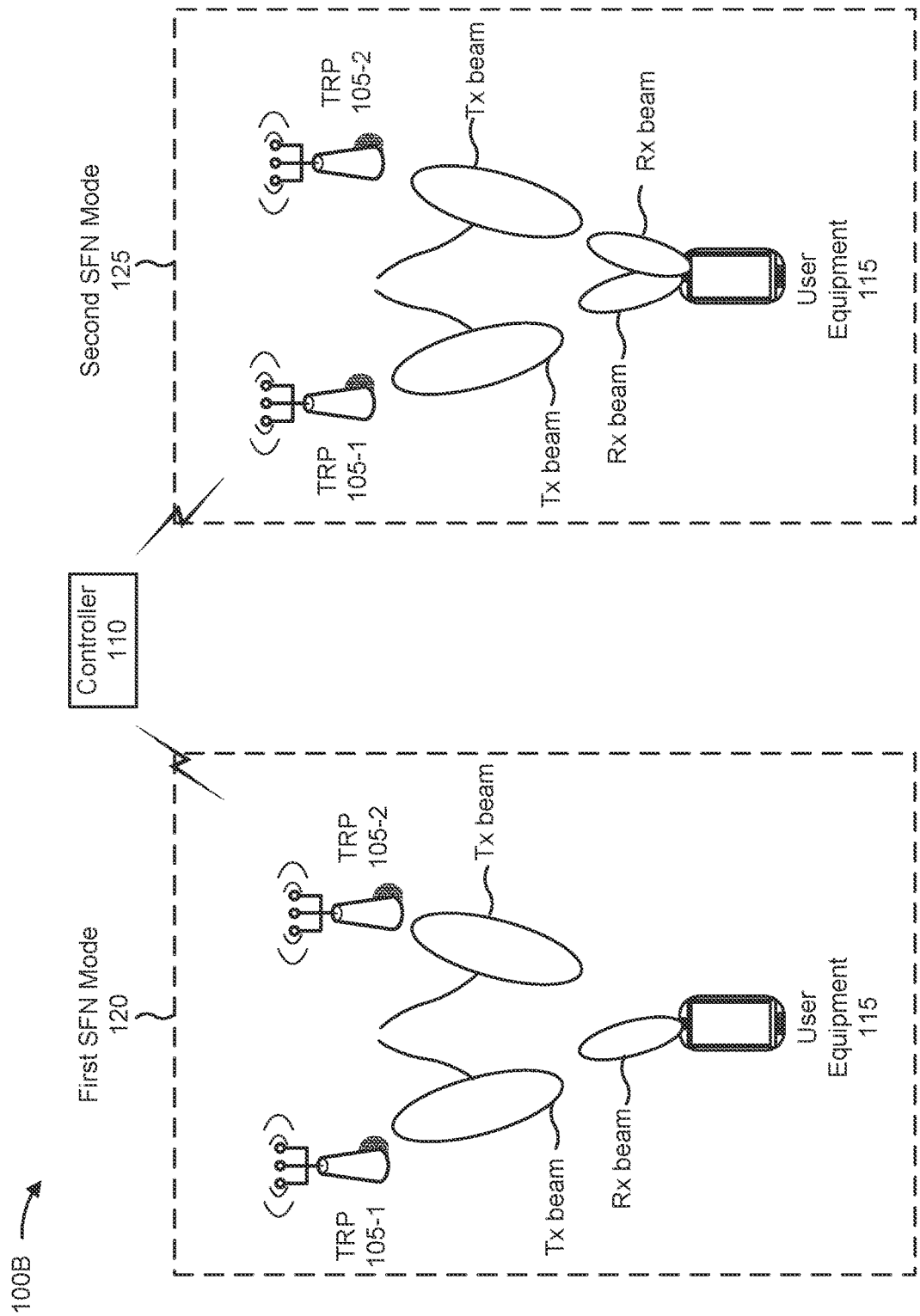
FIG. 1B is a diagram illustrating an example associated with an SFN communication technique in accordance with the present disclosure.

FIG. 1A is a diagram illustrating an example 100A associated with a CJT communication technique in accordance with the present disclosure. FIG. 1B is a diagram illustrating an example 100B associated with an SFN communication technique in accordance with the present disclosure. As shown in FIGS. 1A-1B, an access node in a wireless network may include a controller 110 that may include and/or may communicate with one or more TRPs 105 (e.g., shown as TRP 105-1 to TRP 105-4 in FIG. 1A and TRP 105-1 to TRP 105-2 in FIG. 1B) to serve traffic to a UE 115. The one or more TRPs 105 may be referred to collectively as TRPs 105.

The controller 110 may be a central unit (CU) or a distributed unit (DU) of a distributed radio access network (RAN). In some implementations, a backhaul interface to a core network (not explicitly shown in FIGS. 1A-1B) may terminate at the controller 110. The core network may include a control plane component and a user plane component (e.g., a gateway), and the backhaul interface for one or both of the control plane and the user plane may terminate at the controller 110. Additionally, or alternatively, a backhaul interface to one or more neighbor access nodes (e.g., another access node) may terminate at the controller 110.

As an example, the controller 110 may include and/or may communicate with the one or more TRPs 105 (e.g., via an F1 Control (F1-C) interface and/or an F1 User (F1-U) interface). A TRP 105 may include a radio unit (RU) of the distributed RAN, or a TRP 105 may include a DU and an RU of the distributed RAN. In some cases, a TRP 105 may be referred to as a cell, a panel, an antenna array, or an array. A TRP 105 may be connected to a single controller 110 or to multiple controllers 110. In some implementations, a dynamic configuration of split logical functions may be present within the architecture of the distributed RAN, sometimes referred to as a functional split. For example, a packet data convergence protocol (PDCP) layer, a radio link control (RLC) layer, and/or a medium access control (MAC) layer may be configured to terminate at the controller 110 or at a TRP 105.

In some implementations, multiple TRPs 105 may transmit communications (e.g., the same communication or different communications) in a same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some implementations, a TCI state may be used to indicate one or more QCL relationships. A TRP 105 may be configured to individually (e.g., using dynamic selection) or jointly (e.g., using joint transmission with one or more other TRPs 105) serve traffic to a UE 115.

In some implementations, the multiple TRPs 105 may communicate with the same UE 115 in a coordinated manner (e.g., using a CJT communication technique or an SFN communication technique, as described in more detail elsewhere herein) to improve reliability and/or increase throughput. The TRPs 105 may coordinate such communications via an interface between the TRPs 105 (e.g., a backhaul interface and/or a controller 110). The interface may have a smaller delay and/or higher capacity when the TRPs 105 are co-located at the same controller 110 (e.g., when the TRPs 105 are different antenna arrays or panels of the same controller 110) and may have a larger delay and/or lower capacity (as compared to co-location) when the TRPs 105 are located at different controllers 110. The different TRPs 105 may communicate with the UE 115 using different QCL relationships (e.g., different TCI states), different demodulation reference signal (DMRS) ports, and/or different layers (e.g., of a multi-layer communication).

In some implementations, a single physical downlink (DL) control channel (PDCCH) may be used to schedule DL data communications for a single physical DL shared channel (PDSCH). In this case, multiple TRPs 105 may transmit communications to the UE 115 on the same PDSCH. For example, a communication may be transmitted using a single codeword with different spatial layers for different TRPs 105 (e.g., where one codeword maps to a first set of layers transmitted by a first TRP 105 and maps to a second set of layers transmitted by a second TRP 105). As another example, a communication may be transmitted using multiple codewords, where different codewords are transmitted by different TRPs 105 (e.g., using different sets of layers).

In either case, different TRPs 105 may use different QCL relationships (e.g., different TCI states) for different DMRS ports corresponding to different layers. For example, a first TRP 105 may use a first QCL relationship or a first TCI state for a first set of DMRS ports corresponding to a first set of layers, and a second TRP 105 may use a second (different) QCL relationship or a second (different) TCI state for a second (different) set of DMRS ports corresponding to a second (different) set of layers.

In some implementations, a TCI state in DL control information (DCI) (e.g., transmitted on the PDCCH) may indicate the first QCL relationship (e.g., by indicating a first TCI state) and the second QCL relationship (e.g., by indicating a second TCI state). The first and the second TCI states may be indicated using a TCI field in the DCI. In general, the TCI field may indicate a single TCI state (for single-TRP transmission) or multiple TCI states (for multi-TRP transmission) when using a single PDCCH to schedule the DL data communications for the single PDSCH.

In some implementations, multiple PDCCHs may be used to schedule DL data communications for multiple corresponding PDSCHs (e.g., one PDCCH for each PDSCH). In this case, a first PDCCH may schedule a first codeword to be transmitted by a first TRP 105, and a second PDCCH may schedule a second codeword to be transmitted by a second TRP 105. Furthermore, first DCI (e.g., transmitted by the first TRP 105) may schedule a first PDSCH communication associated with a first set of DMRS ports with a first QCL relationship (e.g., indicated by a first TCI state) for the first TRP 105, and second DCI (e.g., transmitted by the second TRP 105) may schedule a second PDSCH communication associated with a second set of DMRS ports with a second QCL relationship (e.g., indicated by a second TCI state) for the second TRP 105. The DCI may indicate a corresponding TCI state for a TRP 105 corresponding to the DCI. The TCI field of a DCI indicates the corresponding TCI state (e.g., the TCI field of the first DCI indicates the first TCI state and the TCI field of the second DCI indicates the second TCI state).

As described herein, FIG. 1A depicts an example 100A in which the controller 110 uses the CJT communication technique to cause the TRPs 105 (e.g., TRP 105-1 to TRP 105-4), which are deployed at different positions, to jointly transmit signals to the UE 115. For example, when using the CJT communication technique, the TRPs 105 have access to detailed channel state information (CSI) related to respective serving links from the TRPs 105 to the UE 115.

Based on the detailed CSI, the TRPs 105 jointly transmit the same message to the UE 115 on the same time and frequency resources such that the signals transmitted from each of the TRPs 105 coherently combine at the UE 115. As an example, to ensure that the signals transmitted from different TRPs 105 coherently combine at the UE 115, the signals transmitted from the TRPs 105 are jointly precoded with a prior phase alignment and close synchronization across the TRPs 105 (e.g., by exploiting phase and potential amplitude relations between channels associated with each of the TRPs 105). Accordingly, to enable CJT (e.g., using the CJT communication technique), the signals received at the UE 115 (e.g., transmitted by the TRPs 105) need to be phase aligned. If the signals received at the UE 115 are not phase aligned, then the signals may not coherently combine at the UE 115 and/or may destructively interfere with one another resulting a reduced throughput.

However, in some cases, stringent timing alignment requirements and/or timing delays associated with CJT may make it difficult to transmit the signals via CJT. For example, transmitting the signals via CJT typically requires nanosecond (ns)-level synchronization between the TRPs 105 and/or compensation for propagation delays associated with the signals transmitted from the TRPs 105 to the UE 115, which can be difficult to implement and/or maintain. As a result, in some cases, the transmitted signals do not coherently combine at the UE 115 and/or destructively interfere with one another, which reduces throughput of the transmitted signals. Furthermore, because CJT requires signals from different TRPs 105 to be phase aligned, CJT is typically implemented as an intra-cell feature, with radio frequency (RF) signals from different TRPs 105 sharing a single source (e.g., the controller 110).

In addition, in some cases, a bandwidth value associated with an aligned receiving time (e.g., of the signals received at the UE 115) may be associated with whether the signals can be transmitted via CJT (e.g., at one or more bandwidths). For example, the bandwidth value may be associated with a transmission bandwidth of the signals within which the signals can be phase aligned to support CJT (e.g., based on the aligned receiving time).

As a result, attempting to transmit signals via CJT (e.g., based on stringent timing alignment requirements) when the signals are not capable of being phase aligned to support CJT (e.g., based on the aligned receiving time) may waste resources compared to an alternative transmission mode (e.g., based on less stringent timing alignment requirements). For example, using CJT when phase alignment cannot be achieved may result in more retransmissions or the UE 115 missing one or more transmissions, which reduces downlink performance.

In some cases, such as when CJT cannot be implemented (e.g., because of the ns-level synchronization requirements), an SFN communication technique may be used to improve coverage. For example, when using the SFN communication technique, multiple TRPs 105 may simultaneously transmit signals to the UE 115, and the UE 115 may aggregate, or accumulate, the simultaneous signal transmissions. This may provide improved signal quality and/or improved tolerance for multipath attenuation, among other benefits.

As shown in FIG. 1B, and by reference number 120, the controller 110 may use a first SFN mode to cause TRP 105-1 and TRP 105-2 to transmit the signals to the UE 115 using the same frequency domain resources and the same time domain resources. TRP 105-1 may transmit the signal using a first transmit beam and TRP 105-2 may transmit the signal using a second transmit beam. In the first SFN mode 120, the UE 115 may be unaware that the signals are transmitted on separate transmit beams (e.g., from different TRPs 105). Accordingly, when TRP 105-1 and TRP 105-2 simultaneously transmit the signals to the UE 115, the first SFN mode may be transparent to the UE 115, and the UE 115 may aggregate, or accumulate, the simultaneous signal transmissions from TRP 105-1 and TRP 105-2.

This may provide higher signal quality or higher tolerance for multipath attenuation, among other benefits. For example, the UE 115 may receive the signals using a single receive beam (e.g., may use a single spatial receive direction, among other examples, to receive the message). In other words, TCI states of the different transmit beams used to transmit the message may not be signaled to the UE 115.

As another example, as shown by reference number 125, the controller 110 may use a second SFN mode to cause TRP 105-1 and TRP 105-2 to transmit the signals to the UE 115 using the same frequency domain resources and the same time domain resources. TRP 105-1 may transmit the signal using a first transmit beam and TRP 105-2 may transmit the signal using a second transmit beam. In the second SFN mode, the UE 115 may be aware that the signals are transmitted on separate transmit beams (e.g., from different TRPs). For example, a first TCI state of the first transmit beam (e.g., associated with the TRP 105-1) and a second TCI state of the second transmit beam (e.g., associated with TRP 105-2) may be signaled to the UE 115.

For example, the controller 110 may cause configuration information that indicates that the signals may be a combination of transmissions from different TRPs 105 and/or different transmit beams to be transmitted to the UE 115 (e.g., via one or more TRPs 105). The UE 115 may use the configuration information to improve reception performance of the signals. For example, as shown in FIG. 1B, the UE 115 may use different spatial relations (e.g., different receive beams) to receive the signals transmitted from TRP 105-1 and TRP 105-2. This may improve performance of the UE 115 because the UE 115 may receive the signals from different transmit beams and/or different TRPs 105 with improved signal strength and/or signal quality, among other examples.

In some cases, the controller 110 may use a single transmission mode rather than a joint transmission mode (e.g., the CJT communication technique or the SFN communication technique). For example the controller 110 may transmit a signal from one TRP 105 of the multiple TRPs 105 based on determining that transmission from the one TRP 105 is advantageous (e.g., the one TRP 105 has greater average throughput relative to the multiple TRPs 105).

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Thus, in some cases, because CJT requires signals from different TRPs 105 to be phase aligned, CJT is typically implemented as an intra-cell feature, with radio frequency (RF) signals from different TRPs 105 sharing a single source (e.g., the controller 110). Because CJT significantly improves DL performance in mTRP scenarios, it would be desirable to extend CJT use cases beyond intra-cell. However, inter-cell CJT is challenging because it requires the UE 115 to provide a significant amount of joint feedback, including precoding matrix indicators (PMIs), channel quality indicators (CQIs), and/or rank indicators (RIs) for various transmission hypotheses. This limits inter-cell CJT to highly controlled scenarios. If CJT requirements are interpreted strictly (e.g., aligning phase at an ns-level accuracy and a comparable propagation delay from each TRP), the necessary UE feedback poses challenges for deploying inter-cell CJT. Other techniques may interpret joint transmission more liberally, implementing an SFN-type transmission rather than true CJT, which results in limited gain and/or use in lightly loaded scenarios.

Some implementations described herein provide enhanced mTRP communications based on timing difference information associated with DL and/or uplink (UL) reference signals (RSs), which a controller 110 may use to adjust timings for signals transmitted by different TRPs 105. For example, the controller 110 (e.g., associated with an mTRP configuration) may acquire information that indicates timing difference information between a first TRP 105 and a second TRP 105 relative to a user equipment (UE). In some implementations, the timing difference information may be based on carrier phase measurements associated with positioning reference signals (PRSs) that support carrier phase measurements, which enables ns-level timing accuracy (e.g., less than ten ns-level timing accuracy) that is sufficient to phase align transmitted signals using CJT techniques.

For example, in some implementations, the controller 110 may configure and transmit PRSs to the UE 115 and may configure the UE 115 to measure the PRSs. In some implementations, the UE 115 may report timing differences (e.g., in phase differences according to whole symbols and/or fractions of a symbol and/or in frequency differences) between TRPs 105 (e.g., between two TRPs 105). In some implementations, the TRPs 105 may pre-compensate the timing differences (e.g., phase differences) and/or may pre-compensate the frequency differences.

Additionally, or alternatively, the controller 110 may configure and direct the UE 115 to transmit the same sounding reference signal (SRS) to TRPs 105 (e.g., two TRPs 105), either at the same time or immediately one after another (e.g., to prevent a timing shift between transmissions). The TRPs 105 may measure the SRS and derive the phase differences and/or frequency differences between the TRPs 105. In some implementations, the TRPs 105 may pre-compensate the timing differences (e.g., phase differences) and/or may pre-compensate the frequency differences.

In some implementations, the controller 110 may synchronize a time and/or a frequency of the first TRP 105 with a time and/or a frequency of the second TRP 105 (e.g., based on the measurements associated with the DL and/or UL RSs). For example, the timing difference information may indicate a phase difference value between the first TRP 105 and the second TRP 105 relative to the UE 115, and the controller 110 may synchronize, based on the phase difference value, a phase of the first TRP 105 with a phase of the second TRP 105 for joint transmission of a first signal by the first TRP 105 and a second signal by the second TRP 105 to the UE 115. As another example, the timing difference information may indicate a frequency difference value between the first TRP 105 and the second TRP 105 relative to the UE 115, and may synchronize, based on the frequency difference value, a frequency of the first TRP 105 with a frequency of the second TRP 105 for joint transmission of a first signal by the first TRP 105 and a second signal by the second TRP 105 to the UE 115.

In some implementations, the controller 110 may acquire UE assistance information (e.g., from the UE 115) that indicates a bandwidth value (e.g., associated with aligned receiving time of the DL RSs received at the UE 115). For example, the bandwidth value may be associated with an aligned receiving time of the signals received at the UE 115 and a bandwidth within which CJT is supported (e.g., based on the aligned receiving time).

For example, signals transmitted at narrower bandwidths (e.g., 15 kilohertz kHz) may be easier to phase align relative to signals transmitted at a wider bandwidths (e.g., 1 megahertz (MHz)). Thus, in some implementations, signals transmitted at a bandwidth within which CJT is supported have an aligned receiving time that enables CJT, and signals transmitted outside (e.g., above) the bandwidth within which CJT is supported have an aligned receiving time that does not support CJT (e.g., the aggregated signal received at the UE 115) will be received similar to received signals transmitted via an SFN transmission).

In some implementations, the controller 110 may select a transmission mode of the first TRP 105 and the second TRP 105 based on the bandwidth value and a bandwidth of the first signal and the second signal for joint transmission. Thus, in some implementations, the controller 110 may select a transmission mode (e.g., a CJT mode, an SFN mode, and/or a single TRP mode) based on the bandwidth value and the bandwidth of the first signal and the second signal for joint transmission.

In this way, some implementations described herein provide improved CJT (e.g., based on ns-level phase alignment accuracy of the DL reference signals received at the UE 115 and/or phase differences that are measured at the TRPs 105 based on SRSs transmitted by the UE 115). Furthermore, some implementations described herein provide flexible operating modes under a single framework (e.g., by selecting a transmission mode based on the UE-assistance information associated with the DL reference signals measured at the UE 115 and/or the phase differences measured at the TRPs 105 based on the SRSs transmitted by the UE 115).

FIGS. 2A-2G are diagrams of an example 200 associated with enhanced mTRP communications. As shown in FIGS. 2A-2G, example 200 includes multiple TRPs 105 (e.g., shown as TRP 105-1 to TRP 105-2, although some implementations may include more than two TRPs 105), a controller 110, and a UE 115.

Figure 2A:
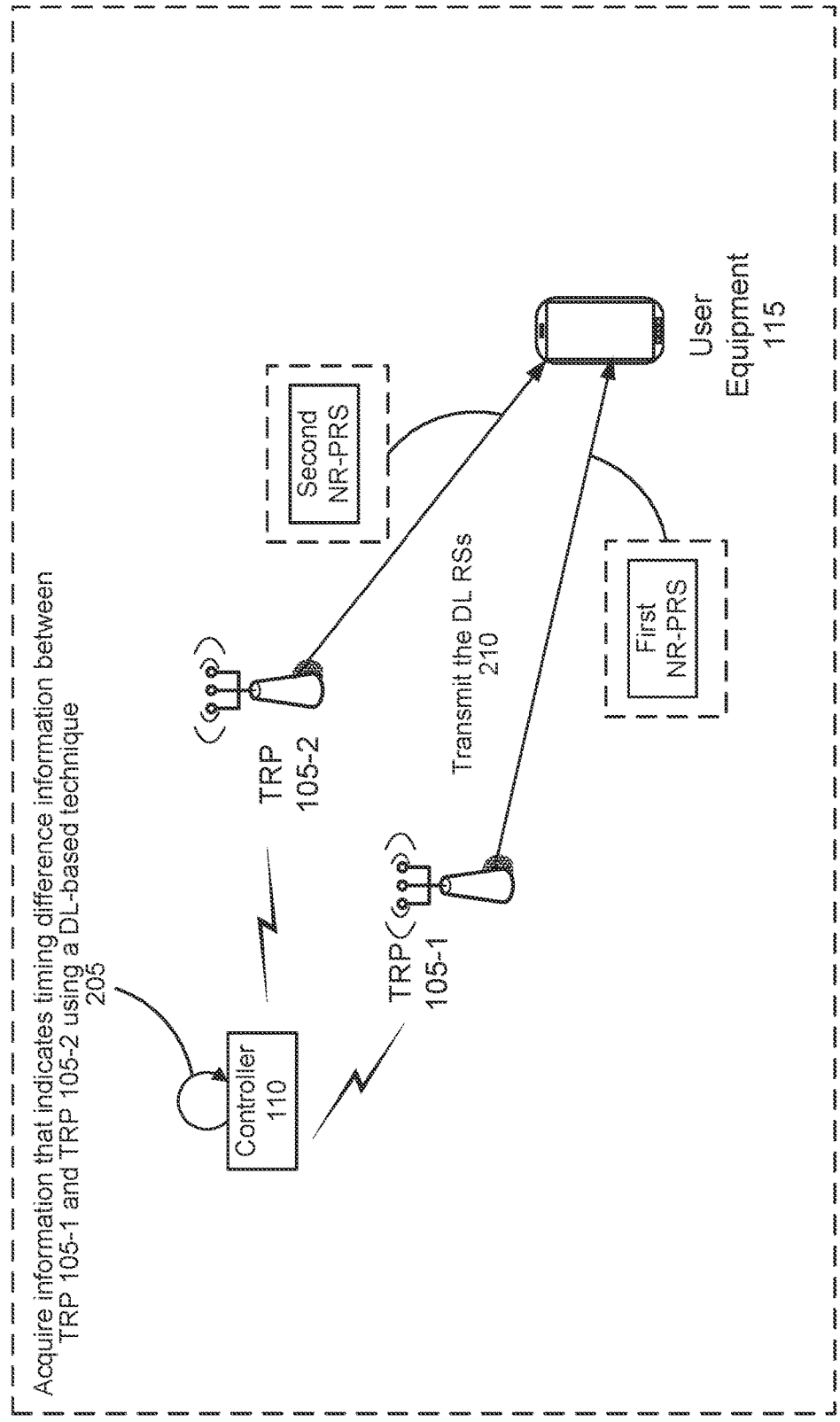
FIGS. 2A-2G are diagrams of examples associated with enhanced mTRP communications.

As shown in FIG. 2A, and by reference number 205, the controller 110 may acquire information that indicates timing difference information between TRP 105-1 and TRP 105-2 using a DL-based technique. In some implementations, the controller 110 may acquire the information that indicates the timing difference information (e.g., between the TRPs 105) based on measurements associated with the DL RSs relative to the UE 115, as described in more detail elsewhere herein.

In some implementations, the DL RSs may support positioning techniques based on carrier phase measurements. For example, as described herein, the DL RSs may be new radio positioning reference signals (NR-PRSs) that support carrier phase-based positioning, and the timing difference information may be based on one or more NR carrier phase measurements associated with the NR PRSs. In this way, the one or more NR carrier phase measurements may be associated with ns-level timing accuracy (e.g., less than ten ns-level timing accuracy). Although some implementations are described herein as using NR-PRS transmissions, it will be appreciated that other suitable DL RSs may be used (e.g., CSI-RSs or SSBs).

As shown by reference number 210, TRP 105-1 and TRP 105-2 may transmit the NR-PRSs (e.g., shown as a first NR-PRS and a second NR-PRS in FIG. 2A) to the UE 115. As an example, the controller 110 may configure the first NR-PRS for transmission by TRP 105-1 and may configure the second NR-PRS for transmission by TRP 105-2 to the UE 115, and the controller 110 may configure the UE 110 to measure the NR-PRSs transmitted by each TRP 105. As shown in FIG. 2A, the first NR-PRS and the second NR-PRS are received at the UE 115. In some implementations, the UE 115 may analyze the first NR-PRS and/or the second NR-PRS to obtain one or more carrier phase measurements, as described in more detail elsewhere herein.

Figure 2B:
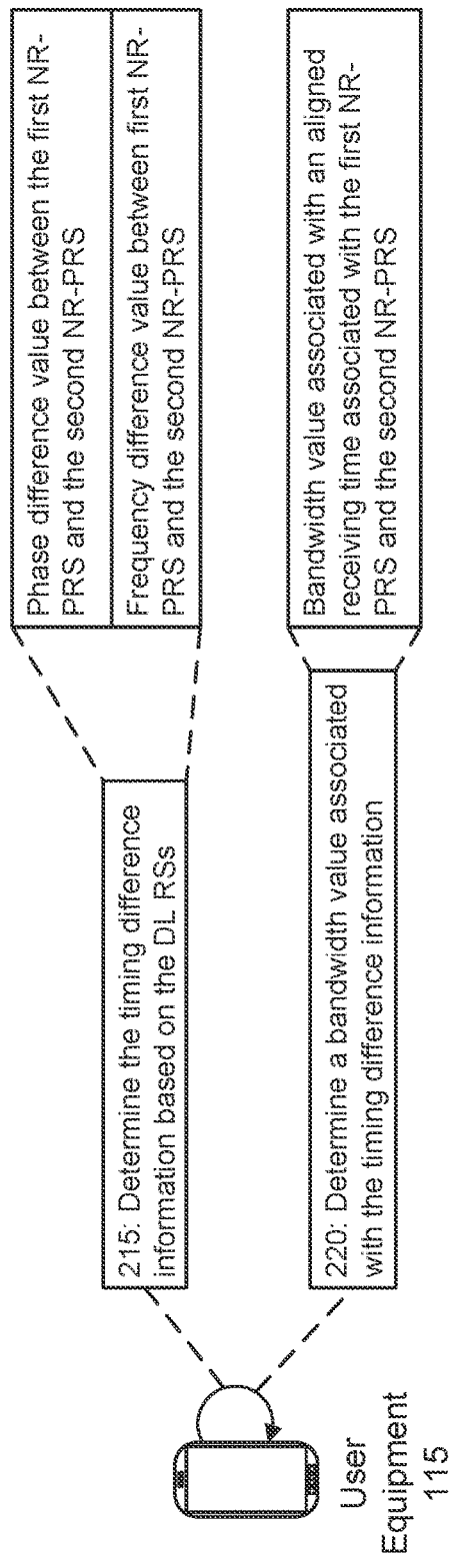

As shown in FIG. 2B, and by reference number 215, the UE 115 may determine the timing difference information based on the NR PRSs. For example, the controller 110 may determine the timing difference information between TRP 105-1 and TRP 105-2 based on the carrier phase measurements that the UE 115 obtained from the first NR-PRS and the second NR-PRS. For example, the controller 110 may configure the UE 115 to measure and report a phase and/or a frequency associated with the first NR-PRS and the second NR-PRS.

In some implementations, the UE 115 may determine one or more difference values associated with the first NR-PRS and/or the second NR-PRS received at the UE 115. For example, the UE 115 may perform one or more carrier phase measurements (e.g., one or more NR carrier phase measurements) associated with the first NR-PRS and/or the second NR-PRS. As an example, the UE 115 may determine a first carrier phase measurement associated with the first NR-PRS and a second carrier phase measurement associated with the second NR-PRS according to one or more whole symbols or fractions of a symbol (e.g., one or more whole orthogonal frequency-division multiplexing (OFDM) symbols or fractions of OFDM symbols). For example, the UE 115 may determine a phase difference value (e.g., according to one or more whole symbol or fractions of a symbol) that is a difference between the first carrier phase measurement associated with the first NR-PRS and the second carrier phase measurement associated with the NR-PRS.

As another example, the UE 115 may perform one or more carrier frequency measurements (e.g., one or more NR carrier frequency measurements) associated with the first NR-PRS and/or the second NR-PRS. For example, the UE 115 may determine a first carrier frequency measurement associated with the first NR-PRS and a second carrier frequency measurement associated with the second NR-PRS. In some implementations, the UE 115 may determine a frequency difference value that is a difference between the first carrier frequency measurement associated with the first NR-PRS and the second carrier frequency measurement associated with the NR-PRS.

In some implementations, the UE 115 may transmit the phase difference value and/or the frequency difference value to the controller 110 (e.g., via the TRPs 105) as UE assistance information, as described in more detail elsewhere herein.

As further shown in FIG. 2B, and by reference number 220, the UE 115 may determine a bandwidth value associated with the timing difference information (e.g., based on the first NR-PRS and/or the second NR-PRS). In some implementations, the bandwidth value may be associated with an aligned receiving time of the first NR-PRS and the second NR-PRS at the UE 115. As an example, the UE 115 may determine the bandwidth value associated with the aligned receiving time of the first NR-PRS and the second NR-PRS based on a difference between a receiving time (e.g., at the UE 115) of the first NR-PRS and the second NR-PRS. Based on the aligned receiving time of the first NR-PRS and the second NR-PRS, the UE may determine a phase-aligned bandwidth that supports CJT.

In some implementations, the bandwidth value may be set to zero in cases where timing synchronization is inadequate for phase-aligned CJT at a minimum bandwidth (e.g., one physical resource block PRB) to indicate that CJT is not supported by the UE 115. In such cases, for example, the controller may use SFN transmissions rather than CJT transmissions. In some implementations, the UE 115 may generate UE assistance information that includes the phase difference value, the frequency difference value, and/or the bandwidth value, and the UE 115 may transmit the UE assistance information to the TRPs 105 and/or the controller 110.

Thus, in some implementations, the controller 110 may use a DL-based method to acquire the timing difference information between the TRPs 105 (e.g., as shown and described in connection with FIGS. 2A-2B and/or elsewhere herein). In some implementations, the controller 110 may use an alternative UL-based method to acquire the timing difference information between the TRPs 105 (e.g., as shown and described in connection with FIGS. 2C-2D and/or elsewhere herein). As an example, acquiring the timing difference information between the TRPs 105 using a UL-SRS may be sufficient in certain scenarios and/or contexts (e.g., indoor environments and/or large bandwidth availability)

Figure 2C:
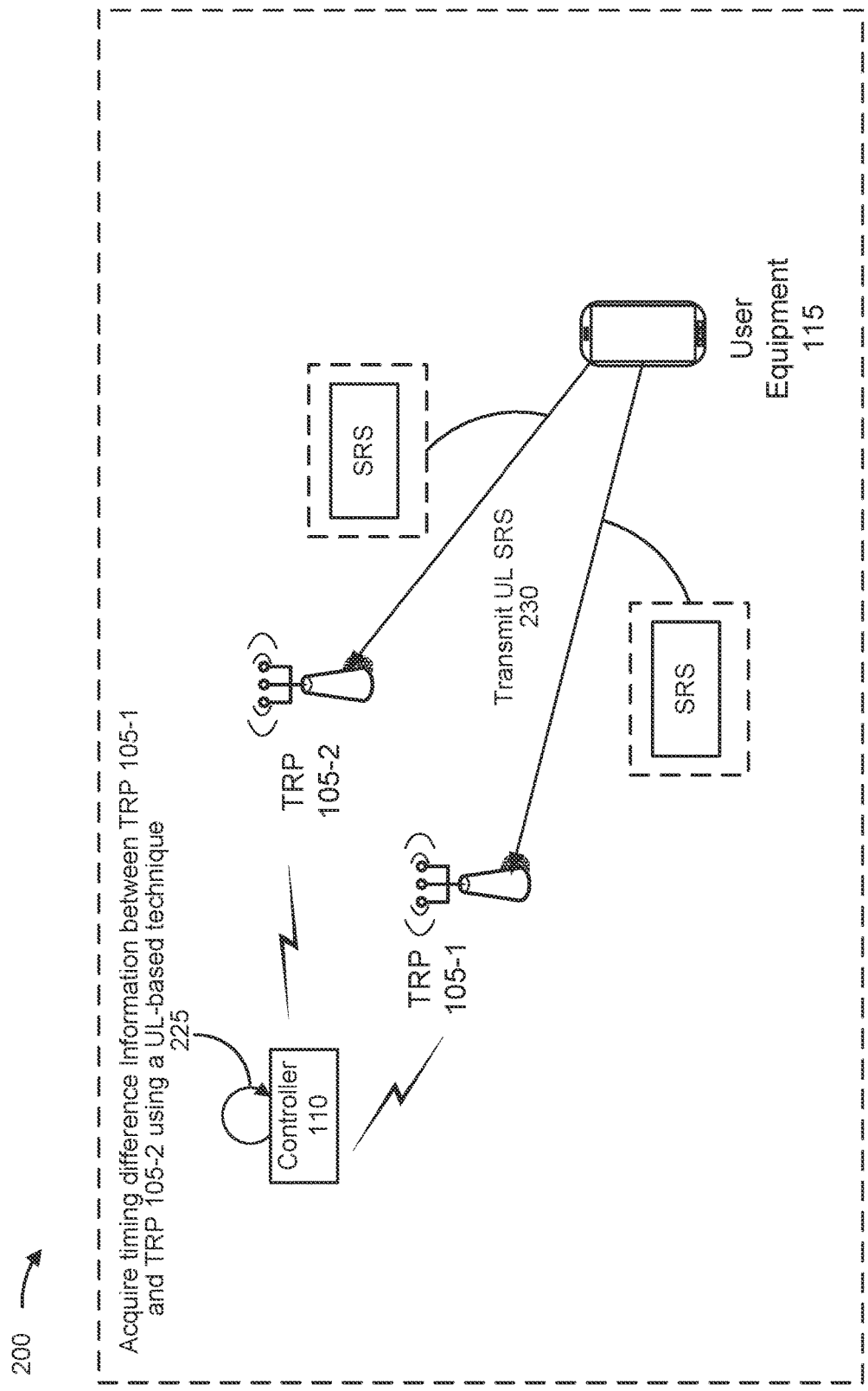

As shown in FIG. 2C, and by reference number 225, the controller 110 may acquire information that indicates timing difference information between TRP 105-1 and TRP 105-2 using a UL-based technique. In some implementations, the controller 110 may acquire the information that indicates the timing difference information (e.g., between the TRPs 105) based on measurements associated with the UL-SRSs relative to the UE 115, as described in more detail elsewhere herein.

As shown by reference number 230, the UE 115 may transmit the UL SRS (e.g., to be received by TRP 105-1 and TRP 105-2). In some implementations, the controller 110 may configure the SRS for transmission by the UE 115 to TRP 105-1 and TRP 105-2. As an example, the controller 110 may configure the UE 115 to transmit the SRS to TRP 105-1 and TRP 105-2 at the same time or sequentially (e.g., immediately after one another) to prevent a timing shift between transmissions of the SRS to TRP 105-1 and TRP 105-2. As an example, TRP 105-1 and/or TRP 105-2 may each measure the SRS and derive phase (and possibly frequency) differences that the TRPs 105 can then use to pre-compensate the timing (and possibly frequency) differences. For example, as described in more detail elsewhere herein, the controller 110 may acquire timing difference information between the TRPs 105 based on the SRS transmitted to the TRPs 105.

Figure 2D:
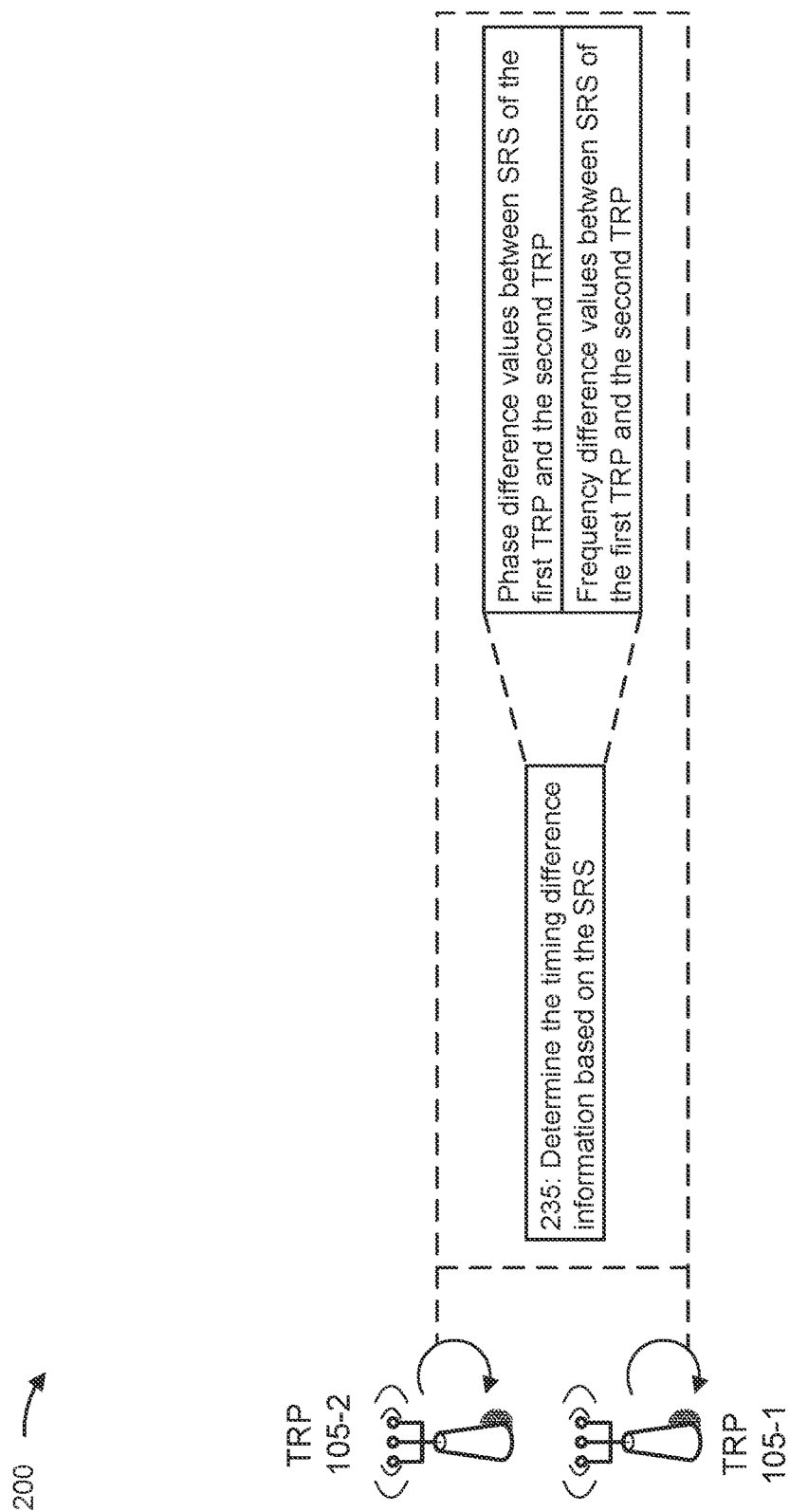

For example, as shown in FIG. 2D, and by reference number 235, TRP 105-1 and/or TRP 105-2 may determine the timing difference information based on the SRS. As an example, TRP 105-1 and/or TRP 105-2 may determine the timing difference information between TRP 105-1 and TRP 105-2 based on measurements associated with the SRS. For example, the controller 110 may configure TRP 105-1 and/or TRP 105-2 to measure a phase and/or a frequency associated with the SRS.

In some implementations, TRP 105-1 and/or TRP 105-2 may determine a phase difference value based on a phase difference between a measured phase of the SRS received at TRP 105-1 a measured phase of the SRS received at TRP 105-2 and/or a frequency difference value based on a measured frequency of the SRS received at TRP 105-1 and a measured frequency of the SRS received at TRP 105-2. As an example, TRP 105-1 and/or TP 105-2 may indicate the phase difference value according to one or more whole symbols or fractions of a symbol. As an example, TRP 105-1 and/or TRP 105-2 may transmit the phase difference value and/or the frequency difference value as the timing difference information to the controller 110.

Figure 2E:
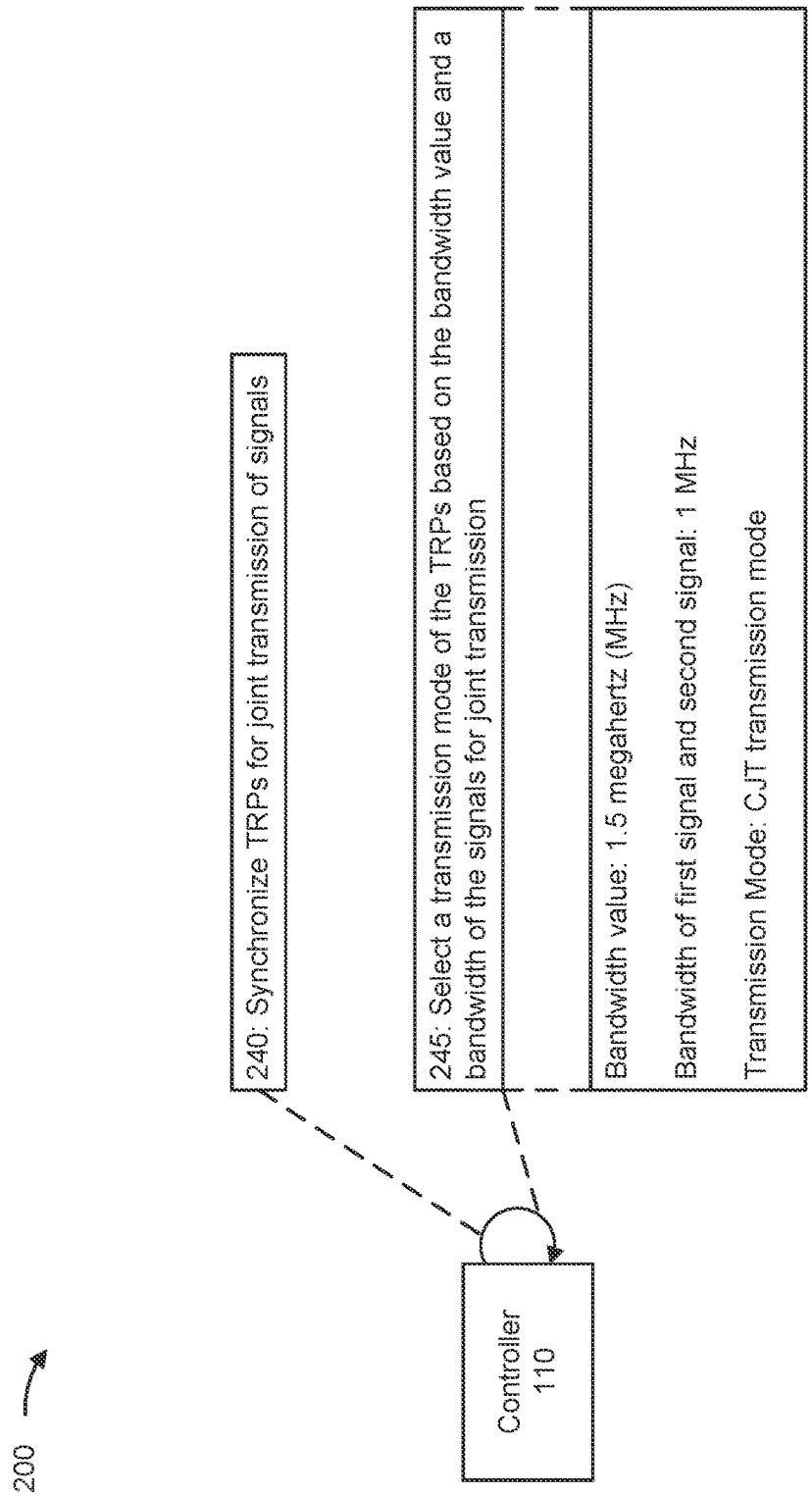

As shown in FIG. 2E, and by reference number 240, the controller 110 may synchronize TRPs 105 for joint transmission. In some implementations, the controller 110 may perform one or more synchronizations of the TRPs 105 based on the timing difference information. For example, the controller 110 may based on the timing difference information, synchronize a time of a first TRP 105 (e.g., TRP 105-1 of FIG. 2A) with a time of a second TRP (e.g., TRP 105-2 of FIG. 2A) for joint transmission of a first signal by TRP 105-1 and a second signal by TRP 105-2 to the UE.

As an example, the controller 110 may synchronize a phase of the first TRP 105-1 with a phase of the second TRP 105-2 based on the phase difference value (e.g., based on the one or more NR-PRS and/or SRS transmissions). As another example, the controller 110 may synchronize a frequency of the first TRP 105-1 with a frequency of the second TRP 105-2 based on the frequency difference value (e.g., based on the one or more NR-PRS and/or the one or more SRS frequency carrier measurements). In this way, the controller 110 may perform adjustments (e.g., timing and/or frequency adjustments) based on highly accurate carrier phase measurements associated with NR-PRSs and/or SRSs. As an example, the NR-PRS and SRS methods can both allow phase-aligned CJT for RRUs with 100-150 ns timing accuracy and 0.1 parts per million (ppm) frequency accuracy.

As shown by reference number 245, the controller may select a transmission mode of the TRPs 105 based on the bandwidth value and a bandwidth of the signals for joint transmission. In some implementations, the bandwidth value may be associated with the aligned receiving time of the signals received at the UE 115 and a bandwidth within which CJT is supported (e.g., based on the aligned receiving time). As an example, the controller 110 may select the transmission mode of the first TRP 105-1 and the second TRP 105-2 based on the bandwidth value and a bandwidth of the first signal and the second signal for joint transmission.

For example, as shown in FIG. 2E, if the bandwidth value indicates that a phase-aligned CJT bandwidth is 1.5 megahertz (MHz), (e.g., the first signal and the second signal can be phase aligned within the indicated bandwidth to support CJT), then the controller 110 may select the CJT mode if the bandwidth of the first signal and the bandwidth of the second signal is 1 MHz (e.g., within the phase-aligned CJT bandwidth).

As another example, if the bandwidth value indicates a bandwidth within which CJT is not supported (e.g., the first signal and the second signal cannot be phase aligned within the indicated bandwidth to support CJT), then the controller 110 may select a different transmission mode, such as an SFN transmission mode, as described in more detail elsewhere herein.

In some implementations, the UE 115 may generate information (e.g., UE assistance information) that indicates that the timing difference information between the first TRP 105 (e.g., TRP 105-1) and the second TRP (e.g., TRP 105-2) fails to satisfy one or more conditions for CJT. In some implementations, the one or more conditions for CJT may be a condition that there is a bandwidth within which CJT is supported based on the aligned receiving time of the signals received at the UE 115.

For example, if there is no bandwidth within which CJT is supported based on the aligned receiving time of the signals received at the UE 115 (e.g., timing synchronization for a minimum bandwidth, such as one (1) PRB, is inadequate for phase-aligned CJT), then the UE 115 may determine that the timing difference information fails to satisfy the one or more conditions for CJT. Based on determining that the timing difference information fails to satisfy the one or more conditions for CJT, the UE 115 may generate the UE assistance information that indicates that the timing difference information fails to satisfy the one or more conditions for CJT (e.g., the UE 115 may set the bandwidth value to zero).

In some implementations, the controller 10 may select a transmission mode other than the CJT mode based on the bandwidth value being indicated as zero and/or based on a signal to be transmitted to the UE 115 having a bandwidth that is larger than the phase-aligned CJT bandwidth supported by the UE 115. In this way, the controller 110 does not attempt to transmit signals via CJT (e.g., based on stringent timing alignment requirements) when the signals are not capable of being phase aligned to support CJT (e.g., based on the aligned receiving time) and, as a result, may consume less resources by selecting a transmission mode associated with less stringent timing alignment requirements (e.g., SFN or single TRP transmission).

In some implementations, the controller 110 may select a single transmission mode that transmits a single signal via a single TRP 105 (e.g., instead of using a joint transmission communication technique). For example, if one TRP 105 of the multiple TRPs 105 in the mTRP configuration is associated with advantageous conditions (e.g., a higher average throughput) relative to other TRPs 105, then the controller 110 may select the single transmission mode and may configure the TRP 105 associated with the advantageous conditions for transmission of a single signal to the UE 115.

Figure 2F:
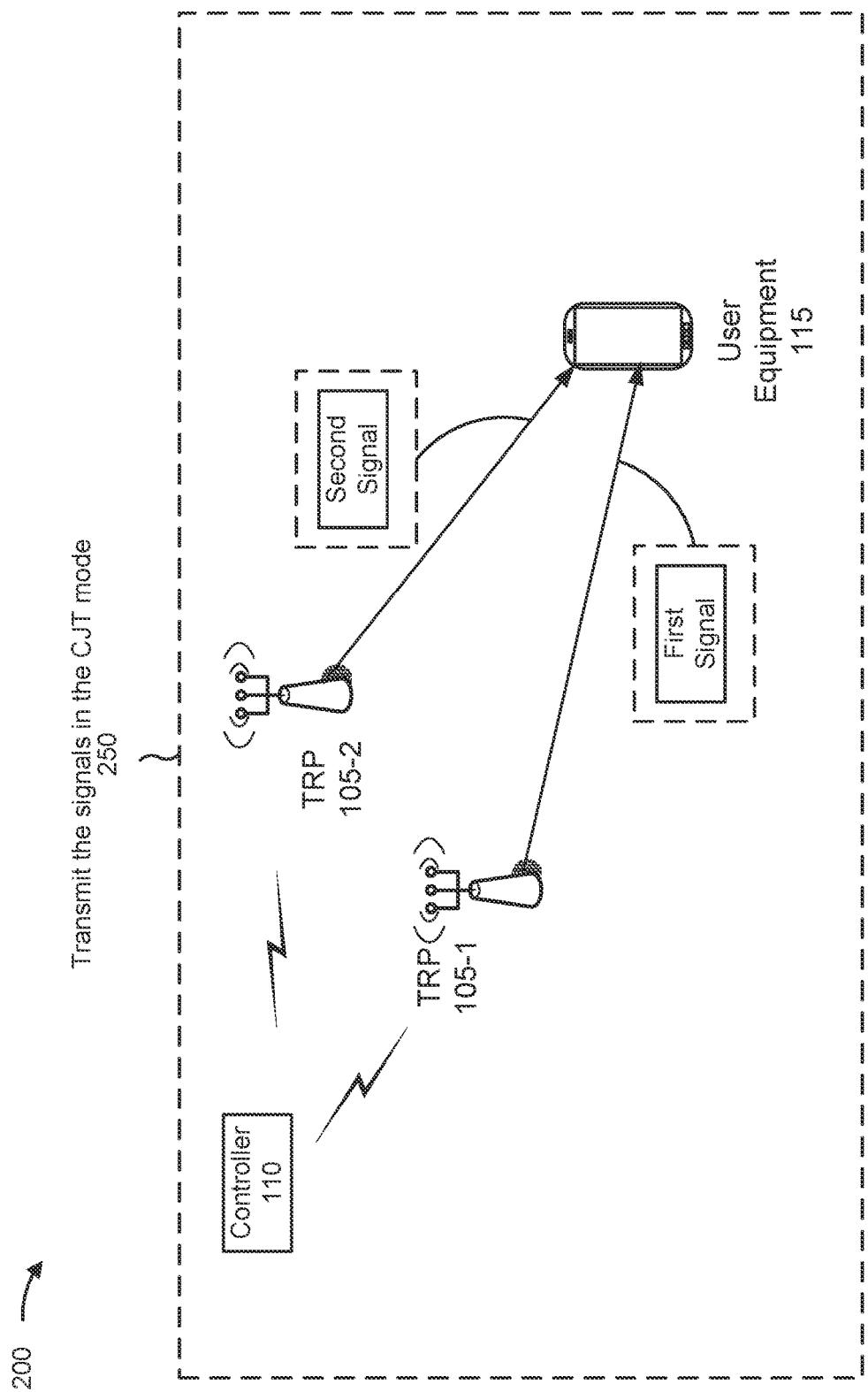

As shown by FIG. 2F, and by reference number 250, the controller may transmit the signals in the CJT mode. As an example, the controller 110 may select the CJT mode based on a bandwidth of the signals to be transmitted being less than the bandwidth within which CJT is supported by the UE 115 (e.g., indicated by the bandwidth value). As another example, the controller 110 may select the CJT mode (e.g., based on the bandwidth value indicating the bandwidth within which CJT is supported) and may configure the bandwidth of the first signal and the second signal to be below the bandwidth indicated by the bandwidth value. As an example, the controller 110 may configure the first signal and the second signal for joint transmission to the UE 115.

Figure 2G:
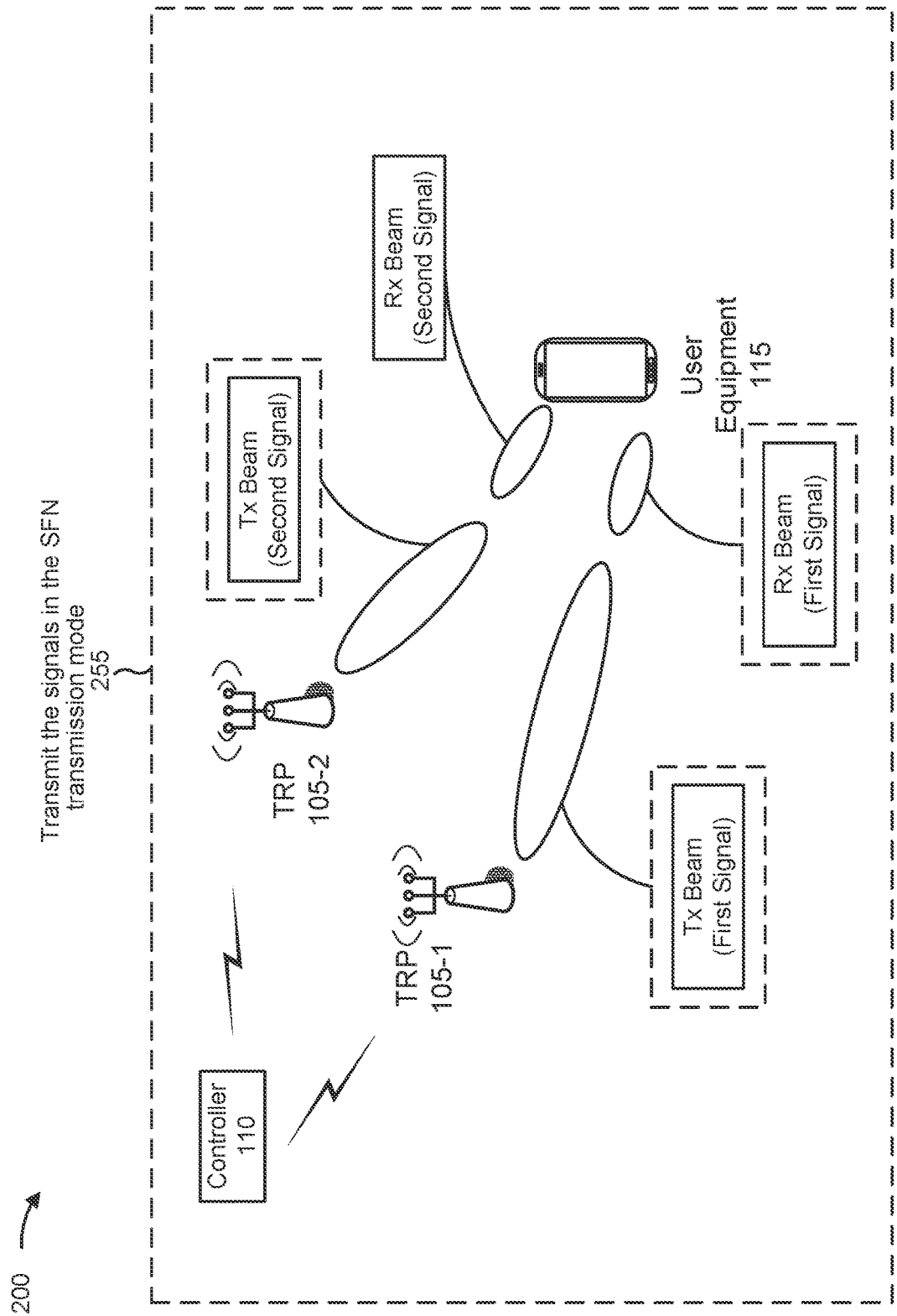

As shown by FIG. 2G, and by reference number 255, the controller 110 may transmit the signals in the SFN transmission mode. For example, the controller 110 may select the SFN transmission mode (e.g., the first or second SFN mode shown and described in connection with FIG. 1B) based on the bandwidth value indicating a value of zero (e.g., a bandwidth within which the UE 115 does not support phase-aligned CJT). As another example, the controller 110 may select the SFN transmission mode based on a bandwidth of the signals to be transmitted being outside of the bandwidth within which CJT is supported by the UE 115 (e.g., indicated by the bandwidth value). As shown in FIG. 2G, the controller 110 may configure the first signal and the second signal for joint transmission based on the second SFN mode (described in connection with FIG. 1B), although it will be appreciated that the controller 110 may configure the first signal and the second signal for joint transmission in the first SFN mode described above in connection with FIG. 1B.

As an example, the controller 110 may configure TRP 105-1 and TRP 105-2 to transmit the signals to the UE 115 using the same frequency domain resources and the same time domain resources. For example, TRP 105-1 may transmit the signal using a first transmit beam (e.g., shown as "TX Beam (First Signal)" in FIG. 2G) and TRP 105-2 may transmit the signal using a second transmit beam (e.g., shown as "TX Beam (Second Signal)" in FIG. 2G). As shown in FIG. 1B, the UE 115 may a first receive beam (e.g., "Rx beam (First Signal)") to receive the first signal transmitted by TRP 105-1 and a second receive beam (e.g., "Rx beam (Second Signal)") to receive the second signal from TRP 105-2. This may improve a performance of the UE 115 because the UE 115 may receive the signals from different transmit beams and/or different TRPs 105 with improved signal strength and/or signal quality, among other examples.

In this way, the implementations described herein provide improved CJT (e.g., based on ns-level phase alignment accuracy of the signals received at the UE 115). Furthermore, the implementations described herein provide flexible operating modes under a single framework (e.g., by selecting a transmission mode based on the UE-assistance information).

As indicated above, FIGS. 2A-2G are provided as an example. Other examples may differ from what is described with regard to FIGS. 2A-2G. The number and arrangement of devices shown in FIGS. 2A-2G are provided as an example. In practice, there may be additional devices, fewer devices, different devices, or differently arranged devices than those shown in FIGS. 2A-2G. Furthermore, two or more devices shown in FIGS. 2A-2G may be implemented within a single device, or a single device shown in FIGS. 2A-2G may be implemented as multiple, distributed devices. Additionally, or alternatively, a set of devices (e.g., one or more devices) shown in FIGS. 2A-2G may perform one or more functions described as being performed by another set of devices shown in FIGS. 2A-2G.

Figure 3:
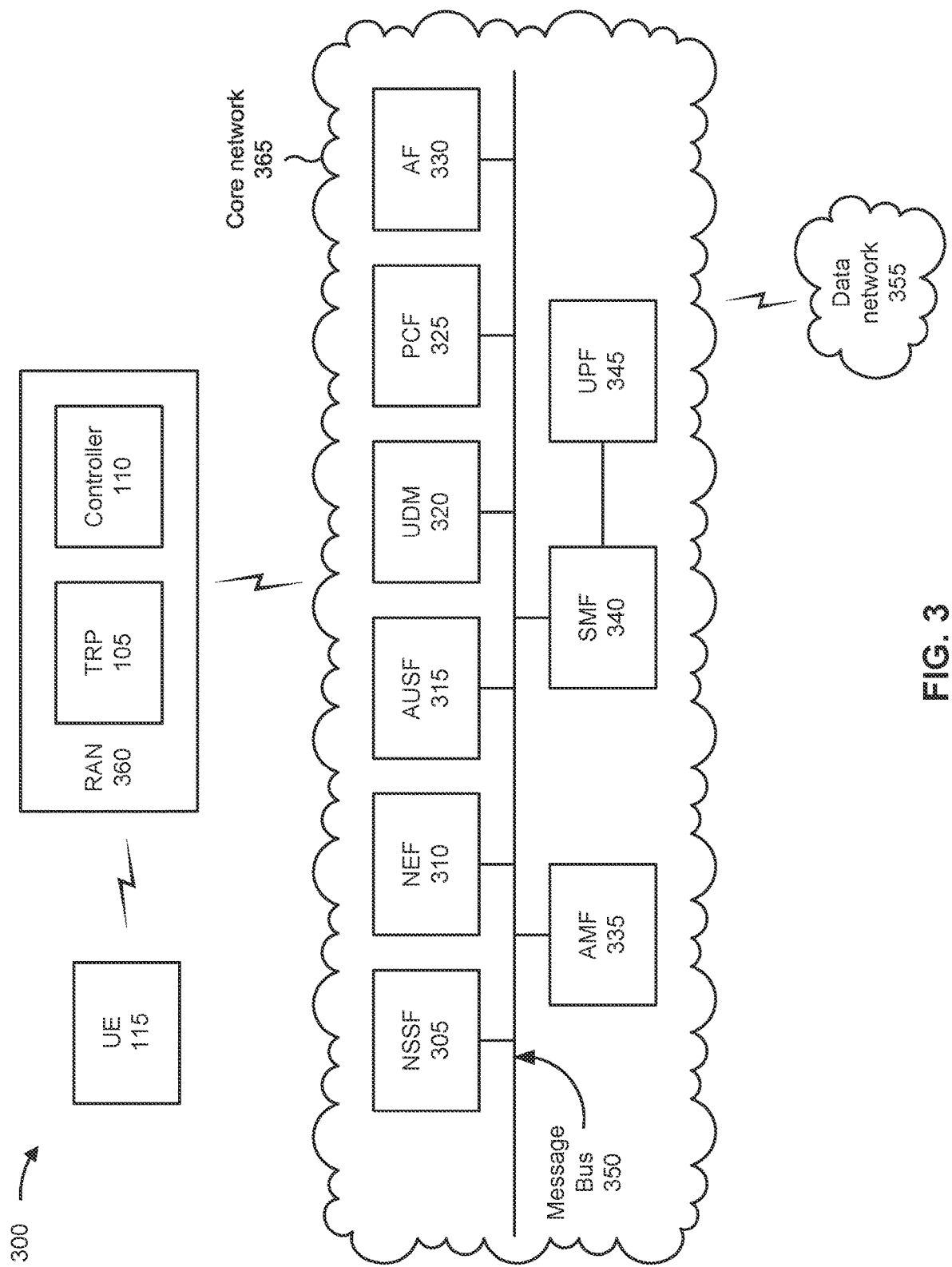
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a UE 115, a RAN 360, a core network 365, and a data network 355. As further shown in FIG. 3, the RAN 360 may include a TRP 105 and/or a controller 110. Devices and/or networks of example environment 300 may interconnect via wired connections, wireless connections, or a combination of wired and wireless connections.

UE 115 includes one or more devices capable of receiving, generating, storing, processing, and/or providing information, such as information described herein. For example, UE 115 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 360 may support, for example, a cellular radio access technology (RAT). RAN 360 may include one or more base stations (e.g., base transceiver stations, radio base stations, node Bs, eNodeBs (eNBs), gNodeBs (gNBs), base station subsystems, cellular sites, cellular towers, access points, TRPs (e.g., TRPs 105), controllers (e.g., controller 110), radio access nodes, macrocell base stations, microcell base stations, picocell base stations, femtocell base stations, or similar types of devices) and other network entities that can support wireless communication for UE 115. RAN 360 may transfer traffic between UE 115 (e.g., using a cellular RAT), one or more base stations (e.g., using a wireless interface or a backhaul interface, such as a wired backhaul interface), and/or core network 365. RAN 360 may provide one or more cells that cover geographic areas.

In some implementations, RAN 360 may perform scheduling and/or resource management for UE 115 covered by RAN 360 (e.g., UE 115 covered by a cell provided by RAN 360). In some implementations, RAN 360 may be controlled or coordinated by a network controller, which may perform load balancing, network-level configuration, and/or other operations. The network controller may communicate with RAN 360 via a wireless or wireline backhaul. In some implementations, RAN 360 may include a network controller, a self-organizing network (SON) module or component, or a similar module or component. In other words, RAN 360 may perform network control, scheduling, and/or network management functions (e.g., for uplink, downlink, and/or sidelink communications of UE 115 covered by RAN 360).

In some implementations, core network 365 may include an example functional architecture in which systems and/or methods described herein may be implemented. For example, core network 365 may include an example architecture of a fifth generation (5G) next generation (NG) core network included in a 5G wireless telecommunications system. While the example architecture of core network 365 shown in FIG. 3 may be an example of a service-based architecture, in some implementations, core network 365 may be implemented as a reference-point architecture and/or a 4G core network, among other examples.

As shown in FIG. 3, core network 365 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, and/or a user plane function (UPF) 345. These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 305 includes one or more devices that select network slice instances for UE 115. By providing network slicing, NSSF 305 allows an operator to deploy multiple substantially independent end-to-end networks potentially with the same infrastructure. In some implementations, each slice may be customized for different services.

NEF 310 includes one or more devices that support exposure of capabilities and/or events in the wireless telecommunications system to help other entities in the wireless telecommunications system discover network services.

AUSF 315 includes one or more devices that act as an authentication server and support the process of authenticating UE 115 in the wireless telecommunications system.

UDM 320 includes one or more devices that store user data and profiles in the wireless telecommunications system. UDM 320 may be used for fixed access and/or mobile access in core network 365.

PCF 325 includes one or more devices that provide a policy framework that incorporates network slicing, roaming, packet processing, and/or mobility management, among other examples.

AF 330 includes one or more devices that support application influence on traffic routing, access to NEF 310, and/or policy control, among other examples.

AMF 335 includes one or more devices that act as a termination point for non-access stratum (NAS) signaling and/or mobility management, among other examples.

SMF 340 includes one or more devices that support the establishment, modification, and release of communication sessions in the wireless telecommunications system. For example, SMF 340 may configure traffic steering policies at UPF 345 and/or may enforce user equipment IP address allocation and policies, among other examples.

UPF 345 includes one or more devices that serve as an anchor point for intra-RAT and/or inter-RAT mobility. UPF 345 may apply rules to packets, such as rules pertaining to packet routing, traffic reporting, and/or handling user plane QoS, among other examples.

Message bus 350 represents a communication structure for communication among the functional elements. In other words, message bus 350 may permit communication between two or more functional elements.

Data network 355 includes one or more wired and/or wireless data networks. For example, data network 355 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
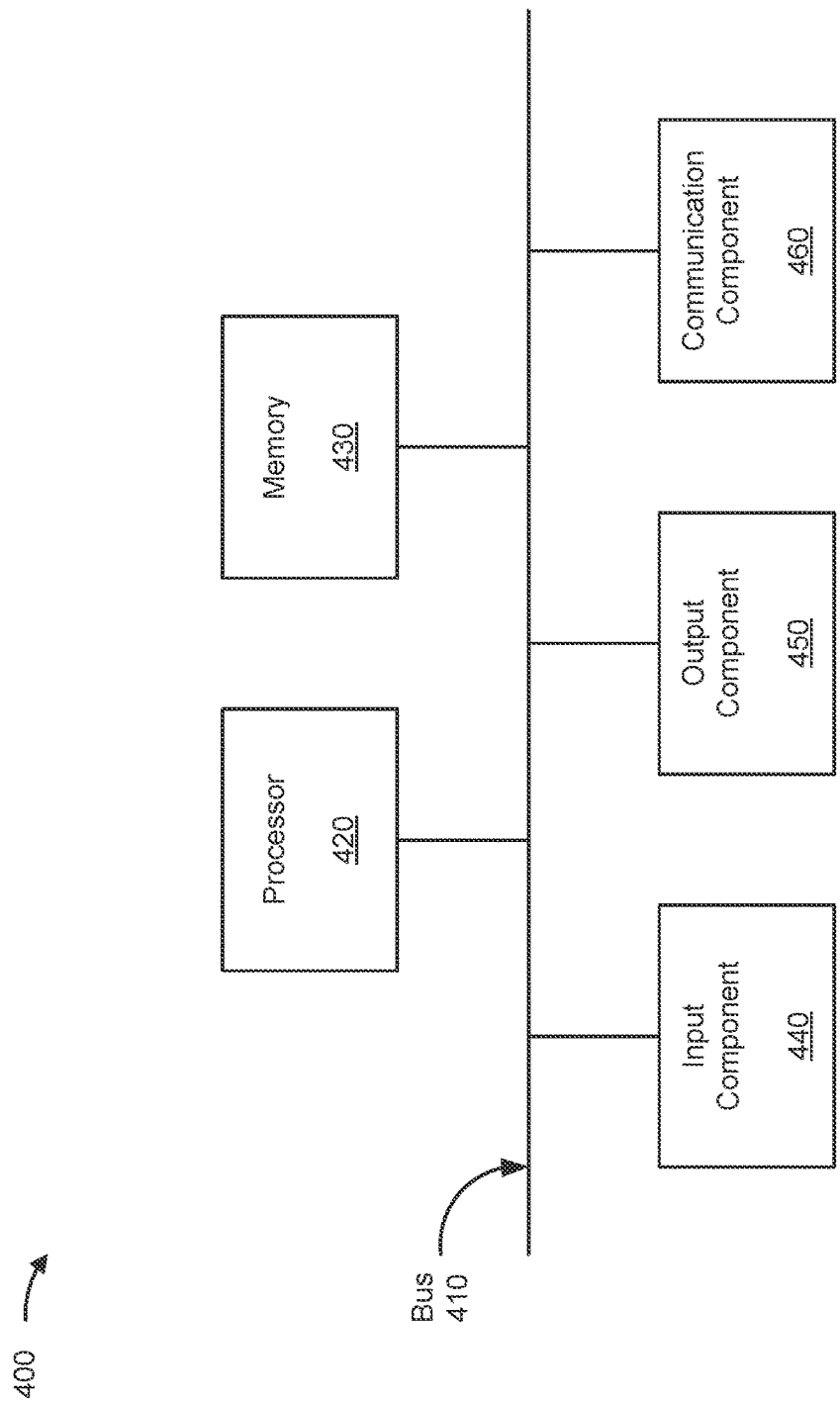
FIG. 4 is a diagram of example components of a device associated with enhanced mTRP communications.

FIG. 4 is a diagram of example components of a device 400 associated with enhanced mTRP communications. The device 400 may correspond to the TRP 105, the controller 110, the UE 115, the NSSF 305, the NEF 310, the AUSF 315, the UDM component 320, the PCF 325, the AF 330, the AMF 335, the SMF 340, and/or the UPF 345. In some implementations, the TRP 105, the controller 110, the UE 115, the NSSF 305, the NEF 310, the AUSF 315, the UDM component 320, the PCF 325, the AF 330, the AMF 335, the SMF 340, and/or the UPF 345 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
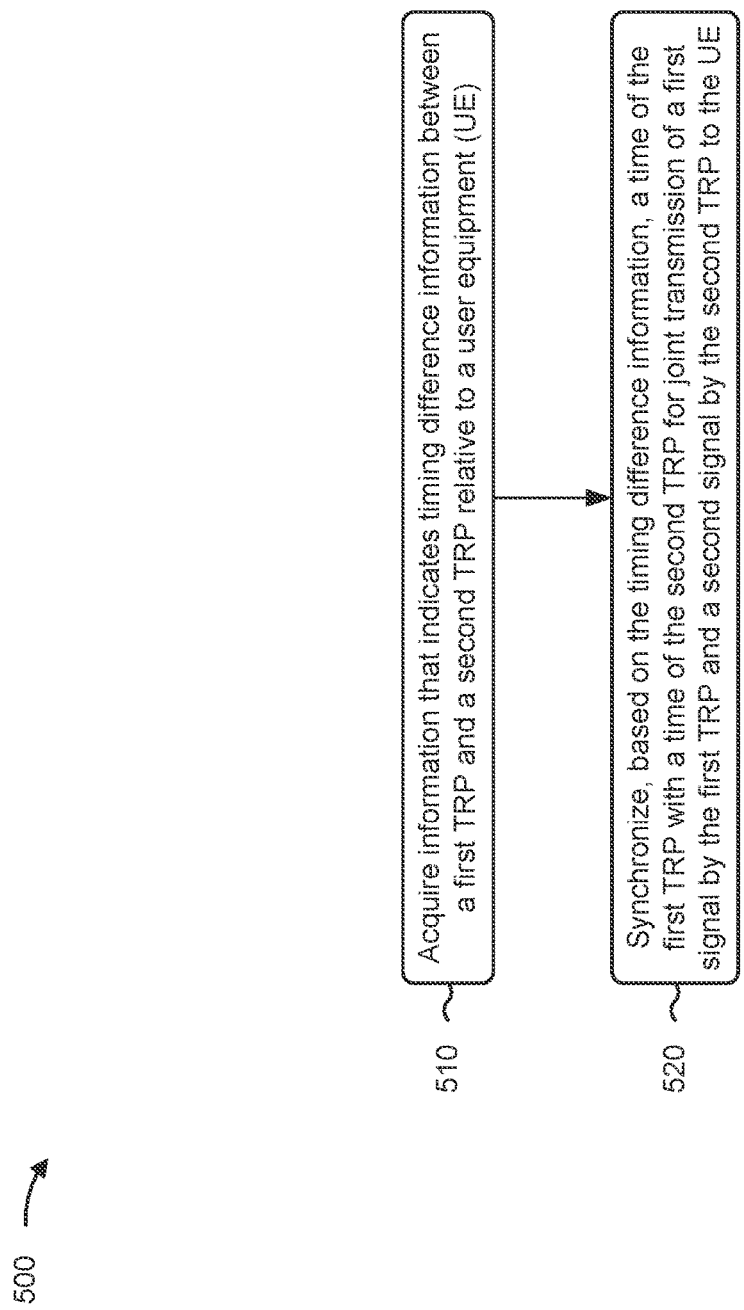
FIG. 5 is a flowchart of an example process associated with enhanced mTRP communications.

FIG. 5 is a flowchart of an example process 500 associated with enhanced mTRP communications. In some implementations, one or more process blocks of FIG. 5 may be performed by a device (e.g., a controller 110) associated with at least a first TRP (e.g., TRP 105-1) and a second TRP (e.g., TRP 105-2). In some implementations, one or more process blocks of FIG. 5 may be performed by another device or a group of devices separate from or including the device (e.g., the controller 110), such as a TRP (e.g., TRP 105), a UE (e.g., UE 115), an NSSF (e.g., NSSF 305), a NEF (e.g., NEF 310), an AUSF (e.g., an AUSF 315), a UDM component (e.g., UDM component 320), a PCF (e.g., PCF 325), an AF (e.g., AF 330), an AMF (e.g., AMF 335), an SMF (e.g., SMF 340), and/or a UPF (e.g., UPF 345). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include acquiring information that indicates timing difference information between the first TRP (e.g., TRP 105-1) and the second TRP (e.g., TRP 105-2) relative to a UE (e.g., UE 115) (block 510). For example, the controller 110 may acquire information that indicates timing difference information based on DL RSs (e.g., NR-PRSs) and/or UL RSs (e.g., SRSs), as described elsewhere herein.

In some implementations, acquiring the information that indicates the timing difference information between the first TRP 105 (e.g., TRP 105-1) and the second TRP 105 (e.g., TRP 105-2) relative to the UE 115 includes transmitting, to the UE 115 via the first TRP 105 and the second TRP 105, NR-PRSs that support carrier phase measurements and acquiring, in UE assistance information based on NR carrier phase measurements associated with the NR-PRSs, the information that indicates the timing difference information between the first TRP 105 and the second TRP 105. As an example, the timing difference information may be indicated according to one or more whole symbols and/or fractions of a symbol.

As further shown in FIG. 5, process 500 may include synchronizing, based on the timing difference information, a time of the first TRP with a time of the second TRP for joint transmission of a first signal by the first TRP and a second signal by the second TRP to the UE (block 520). For example, the controller 110 may synchronize a phase of the first TRP 105 (e.g., TRP 105-1) with a phase of the second TRP 105 (e.g., TRP 105-2) based on the phase difference value (e.g., based on the one or more NR carrier phase measurements), as described elsewhere herein. As another example, the controller 110 may synchronize a frequency of the first TRP 105 (e.g., TRP 105-1) with a frequency of the second TRP 105 (e.g., TRP 105-2) based on the frequency difference value (e.g., based on the one or more NR carrier phase measurements), as described elsewhere herein.

In some implementations, the UE assistance information may indicate a bandwidth value associated with aligned receiving time at the UE (e.g., of signals received at the UE 115). As an example, process 500 may include selecting a transmission mode of the first TRP 105 and the second TRP 105 based on the bandwidth value and a bandwidth of the first signal and the second signal, as described elsewhere herein. In some implementations, the bandwidth value indicated in the UE assistance information may be set to zero to indicate that the timing difference information between the first TRP 105 and the second TRP 105 fails to satisfy one or more conditions for CJT. In some implementations, the transmission mode of the first TRP 105 and the second TRP 105 may be one of a CJT mode, an SFN mode, or a single TRP mode.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    acquiring, by a device associated with at least a first transmission reception point (TRP) and a second TRP, information that indicates timing difference information between the first TRP and the second TRP relative to a user equipment (UE);
    synchronizing, by the device and based on the timing difference information, a time of the first TRP with a time of the second TRP for joint transmission of a first signal by the first TRP to the UE and a second signal by the second TRP to the UE; and
    receiving, by the device, UE assistance information that indicates a bandwidth value associated with an aligned receiving time at the UE,
        wherein a transmission mode of the first TRP and the second TRP is based on the bandwidth value and a bandwidth of the first signal and the second signal.

2. The method of claim 1,
    wherein the timing difference information is based on one or more new radio carrier phase measurements, and
    wherein synchronizing the time of the first TRP with the time of the second TRP comprises:
        synchronizing a phase of the first TRP with a phase of the second TRP based on the one or more new radio carrier phase measurements.

3. The method of claim 1,
    wherein the timing difference information is based on one or more new radio carrier phase measurements, and
    wherein the method further comprises:
        synchronizing a frequency of the first TRP with a frequency of the second TRP based on the one or more new radio carrier phase measurements.

4. The method of claim 1,
    wherein acquiring the information that indicates the timing difference information between the first TRP and the second TRP relative to the UE comprises:
        transmitting, to the UE via the first TRP and the second TRP, a new radio positioning reference signal that supports carrier phase measurements; and
        acquiring, in the UE assistance information based on new radio carrier phase measurements associated with the new radio positioning reference signal, the information that indicates the timing difference information between the first TRP and the second TRP according to one or more whole symbols or fractions of a symbol.

5. The method of claim 1,
wherein the bandwidth value is set to zero in the UE assistance information to indicate that the timing difference information between the first TRP and the second TRP fails to satisfy one or more conditions for coherent joint transmission.

6. The method of claim 1,
wherein the transmission mode of the first TRP and the second TRP is one of:
a coherent joint transmission mode,
a single frequency network mode, or
a single TRP mode.

7. The method of claim 1,
wherein acquiring the information that indicates the timing difference information between the first TRP and the second TRP relative to the UE comprises:
measuring the timing difference information between the first TRP and the second TRP based on a sounding reference signal transmitted from the UE to the first TRP and the second TRP.

8. The method of claim 1, wherein the bandwidth value is associated with a transmission bandwidth of the first signal and the second signal within which the first signal and the second signal are phase aligned to support coherent joint transmission based on the aligned receiving time.

9. A user equipment (UE), comprising:
one or more processors configured to:
transmit, to a device associated with at least a first transmission reception point (TRP) and a second TRP, information that indicates timing difference information between the first TRP and the second TRP relative to the UE;
receive, via joint transmission from the first TRP and the second TRP, a first signal from the first TRP and a second signal from the second TRP,
wherein a time of the first TRP is synchronized with a time of the second TRP based on the timing difference information; and
transmit UE assistance information that indicates a bandwidth value associated with aligned receiving time at the UE,
wherein a transmission mode of the first TRP and the second TRP is based on the bandwidth value and a bandwidth of the first signal and the second signal.

10. The UE of claim 9,
wherein the timing difference information is based on one or more new radio carrier phase measurements.

11. The UE of claim 9,
wherein a frequency of the first TRP and a frequency of the second TRP are synchronized based on the timing difference information.

12. The UE of claim 9,
wherein the one or more processors are further configured to:
receive a new radio positioning reference signal transmitted via the first TRP and the second TRP; and
transmit the UE assistance information that indicates the timing difference information between the first TRP and the second TRP relative to the UE according to one or more whole symbols or fractions of a symbol based on the new radio positioning reference signal.

13. The UE of claim 9,
wherein the bandwidth value is set to zero in the UE assistance information to indicate that the timing difference information between the first TRP and the second TRP fails to satisfy one or more conditions for coherent joint transmission.

14. The UE of claim 9,
wherein the transmission mode of the first TRP and the second TRP is one of:
a coherent joint transmission mode,
a single frequency network mode, or
a single TRP mode.

15. The UE of claim 9,
wherein the one or more processors are further configured to:
transmit, to the first TRP and the second TRP, a sounding reference signal that enables the device to measure a timing difference between the first TRP and the second TRP.

16. The UE of claim 9, wherein the bandwidth value is associated with a transmission bandwidth of the first signal and the second signal within which the first signal and the second signal are phase aligned to support coherent joint transmission based on the aligned receiving time.

17. A non-transitory computer-readable medium storing a set of instructions, the set of instructions comprising:
one or more instructions that, when executed by one or more processors of a device associated with at least a first transmission reception point (TRP) and a second TRP, cause the device to:
acquire information that indicates timing difference information between the first TRP and the second TRP relative to a user equipment (UE);
synchronize, based on the timing difference information, a time of the first TRP with a time of the second TRP for joint transmission of a first signal by the first TRP and a second signal by the second TRP to the UE; and
receive UE assistance information that indicates a bandwidth value associated with aligned receiving time at the UE,
wherein a transmission mode of the first TRP and the second TRP is based on the bandwidth value and a bandwidth of the first signal and the second signal.

18. The non-transitory computer-readable medium of claim 17,
wherein the timing difference information is based on one or more new radio carrier phase measurements, and
wherein the one or more instructions that cause the device to synchronize the time of the first TRP with the time of the second TRP cause the device to:
synchronize a phase of the first TRP with a phase of the second TRP based on the one or more new radio carrier phase measurements.

19. The non-transitory computer-readable medium of claim 17,
wherein the timing difference information is based on one or more new radio carrier phase measurements, and
wherein the one or more instructions, when executed by the one or more processors, further cause the device to:
synchronize a frequency of the first TRP with a frequency of the second TRP based on the one or more new radio carrier phase measurements.

20. The non-transitory computer-readable medium of claim 17,
wherein the one or more instructions that cause the device to acquire the information that indicates the timing difference information between the first TRP and the second TRP relative to the UE cause the device to:

transmit, to the UE via the first TRP and the second TRP, a new radio positioning reference signal; and acquire, in the UE assistance information based on new radio carrier phase measurements associated with the new radio positioning reference signal, the information that indicates the timing difference information between the first TRP and the second TRP according to one or more whole symbols or fractions of a symbol.

* * * * *